(12) United States Patent
Yang et al.

(10) Patent No.: US 11,392,674 B2
(45) Date of Patent: Jul. 19, 2022

(54) ELECTRONIC DEVICE DETECTING PRIVILEGE ESCALATION OF PROCESS, AND STORAGE MEDIUM

(71) Applicant: Samsung Electronics Co., Ltd., Suwon-si (KR)

(72) Inventors: Jin Mo Yang, Suwon-si (KR); Jung Yoon Kim, Suwon-si (KR); Hee Kwan Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 328 days.

(21) Appl. No.: 16/476,414

(22) PCT Filed: Dec. 29, 2017

(86) PCT No.: PCT/KR2017/015782
§ 371 (c)(1),
(2) Date: Jul. 8, 2019

(87) PCT Pub. No.: WO2018/131831
PCT Pub. Date: Jul. 19, 2018

(65) Prior Publication Data
US 2019/0377866 A1 Dec. 12, 2019

(30) Foreign Application Priority Data
Jan. 10, 2017 (KR) .......................... 10-2017-0003623

(51) Int. Cl.
*G06F 21/30* (2013.01)
*G06F 21/50* (2013.01)
*H04W 12/084* (2021.01)

(52) U.S. Cl.
CPC .............. *G06F 21/30* (2013.01); *G06F 21/50* (2013.01); *H04W 12/084* (2021.01)

(58) Field of Classification Search
CPC ........ G06F 21/30; G06F 21/50; G06F 21/604; G06F 21/602; G06F 2221/2141; H04W 12/084; H04W 12/08; H04L 9/32
See application file for complete search history.

(56) References Cited

U.S. PATENT DOCUMENTS 4,999,709 A * 3/1991 Yamazaki .............. H04N 5/278
348/589
8,955,056 B2 2/2015 Choi et al.
(Continued)

FOREIGN PATENT DOCUMENTS

KR 10-2013-0101656 A 9/2013
KR 10-2014-0044974 A 4/2014
(Continued)

*Primary Examiner* — Abiy Getachew
(74) *Attorney, Agent, or Firm* — Jefferson IP Law, LLP

(57) ABSTRACT

An electronic device is disclosed. The electronic device may include a memory, and a processor electrically connected with the memory. The processor may be configured to install an application, allocate identification information, which is included in a preset range, to the installed application, store, at a first address of the memory, the identification information for indicating access privilege to a system resource, monitor the first address during running of a first process of the application, and terminate the first process, when the identification information stored at the first address is not included in the preset range. Moreover, various embodiment found through the disclosure are possible.

16 Claims, 9 Drawing Sheets

(56) References Cited

U.S. PATENT DOCUMENTS

| | | | |
|---|---|---|---|
| 2006/0263101 A1* | 11/2006 | Takamatsu | G07D 7/12 |
| | | | 399/4 |
| 2011/0036074 A1* | 2/2011 | Akimoto | F02M 26/49 |
| | | | 60/299 |
| 2013/0031631 A1 | 1/2013 | Waltermann et al. | |
| 2013/0227652 A1* | 8/2013 | Choi | G06F 21/554 |
| | | | 726/4 |
| 2016/0314177 A1* | 10/2016 | Veeraraghavan | G06F 16/283 |
| 2017/0024135 A1* | 1/2017 | Christodorescu | G06F 21/552 |
| 2019/0065368 A1* | 2/2019 | Zhao | G06F 12/08 |

FOREIGN PATENT DOCUMENTS

| | | |
|---|---|---|
| KR | 10-1414084 B1 | 7/2014 |
| KR | 10-2014-0139752 A | 12/2014 |
| KR | 10-2016-0133927 A | 11/2016 |

\* cited by examiner

ELECTRONIC DEVICE DETECTING PRIVILEGE ESCALATION OF PROCESS, AND STORAGE MEDIUM

TECHNICAL FIELD

Embodiments disclosed in the disclosure relate to an electronic device for detecting privilege escalation of a process and a storage medium.

BACKGROUND ART

Rooting is to obtain an administrator-level privilege in a device. Although a user is able to perform all desired operations when an electronic device is rooted, there is a risk that the security function of the electronic device is disabled or the electronic device is malfunctioned.

A conventional electronic device inspects whether a UID (user id) value of a process is '0', at the booting of a device to detect the rooting. When the UID is '0', the electronic device 101 compares names registered in a whitelist, which is a list of processes allowed with a root privilege, and the name of a relevant process and determines the device as being rooted when the name of the process is absent in the whitelist.

DISCLOSURE

Technical Problem

However, according to the conventional technology, since the electronic device detects the rooting only at the booting, the electronic device fails to detect the rooting in real time. In addition, since the electronic device manages a process allowed with the root privilege based on the whitelist, the development time may be delayed. There is also the problem that when a malicious user changes the name of the process to the name of the process contained in the whitelist, the electronic device fails to detect the rooting.

To address at least the above-mentioned problems and/or disadvantages and to provide at least the advantages described below, embodiments disclosed in the disclosure is to suggest an invention to detect an abnormal process attempting rooting in real time, to facilitate development as a root process is not managed separately, and to detect the privilege escalation of a process exerting none-influence on the performance of the device.

Technical Solution

According to an embodiment disclosed in the disclosure, an electronic device disclosed in the disclosure may include a memory, and a processor electrically connected with the memory. The processor may be configured to install an application, to allocate identification information, which is included in a preset range, to the installed application, to store, at a first address of the memory, the identification information for indicating access privilege to a system resource, to monitor the first address during running of a first process of the application, and to terminate the first process, when the identification information stored at the first address is not included in the preset range.

In addition, according to an embodiment disclosed in the disclosure, a storage medium may include instructions that, when executed by an electronic device, cause the electronic device to perform installing an application, allocating identification information, which is included in a preset range, to the installed application, storing, at a first address of the memory, the identification information for indicating access privilege to a system resource, monitoring the first address during running of a first process of the application, and terminating the first process, when the identification information stored at the first address does not correspond to the preset range.

According to an embodiment disclosed in the disclosure, an electronic device may include a memory and a processor electrically connected with the memory. The memory may store instructions, and the processor may execute a monitoring module, based on the instructions. The monitoring module may store an address at which identification information, which is included in a preset range, of at least one process is stored, monitor at least one address, at which the identification information for indicating access privilege to a system resource is stored, and terminate a process having identification information, which does not corresponds the preset range, when the identification information, which is not included in the preset range, of identification information stored at the at least one address is detected.

Advantageous Effects

According to embodiments disclosed in the disclosure, the privilege escalation of the process may be detected to prevent the security function of the electronic device from being neutralized.

According to embodiments disclosed in the disclosure, the privilege escalation of the process may be detected in real time without any influence exerted on the performance of the electronic device.

Besides, a variety of effects directly or indirectly understood through the disclosure may be provided.

MODE FOR INVENTION

Figure 1:
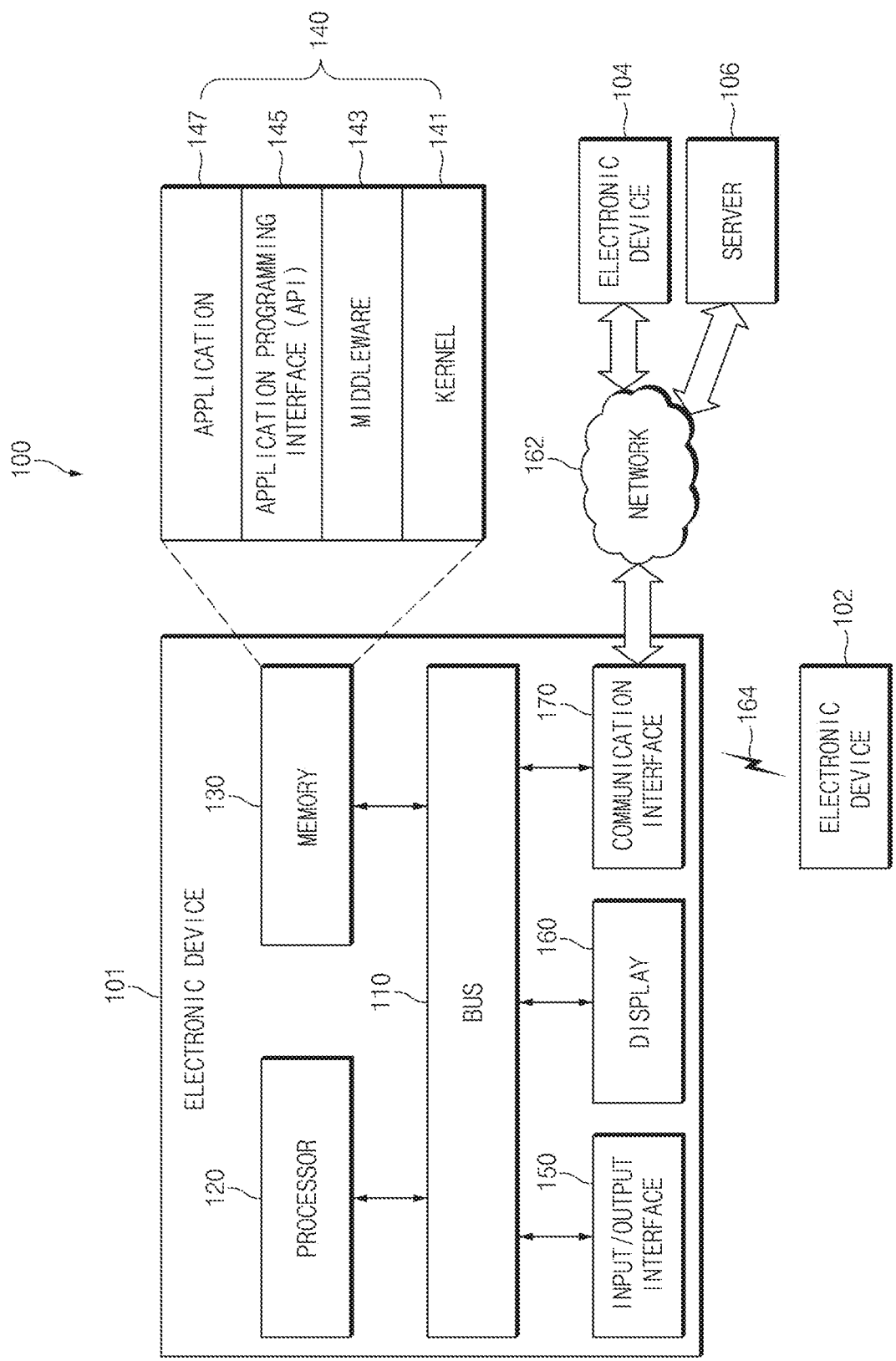
FIG. 1 illustrates an electronic device in a network environment, according to various embodiments.

Hereinafter, various embodiments of the disclosure may be described with reference to accompanying drawings.

Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 illustrates an electronic device in a network environment system, according to various embodiments.

Referring to FIG. 1, according to various embodiments, an electronic device 101, a first electronic device 102, a second electronic device 104, or a server 106 may be connected each other over a network 162 or a short range communication 164. The electronic device 101 may include a bus 110, a processor 120, a memory 130, an input/output interface 150, a display 160, and a communication interface 170. According to an embodiment, the electronic device 101 may not include at least one of the above-described components or may further include other component(s).

For example, the bus 110 may interconnect the above-described components 110 to 170 and may include a circuit for conveying communications (e.g., a control message and/or data) among the above-described components.

The processor 120 may include one or more of a central processing unit (CPU), an application processor (AP), or a communication processor (CP). For example, the processor 120 may perform an arithmetic operation or data processing associated with control and/or communication of at least other components of the electronic device 101.

The memory 130 may include a volatile and/or nonvolatile memory. For example, the memory 130 may store commands or data associated with at least one other component(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may allocate the priority, which makes it possible to use a system resource (e.g., the bus 110, the processor 120, the memory 130, or the like) of the electronic device 101, to at least one of the application program 147. For example, the middleware 143 may process the one or more task requests according to the priority allocated to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other component(s) of the electronic device 101. Furthermore, the input/output interface 150 may output a command or data, received from other component(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 164. The short range communication 164 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the first electronic device 102, the second electronic device 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from another device (e.g., the electronic device 102 or 104 or the server 106). The other electronic device may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
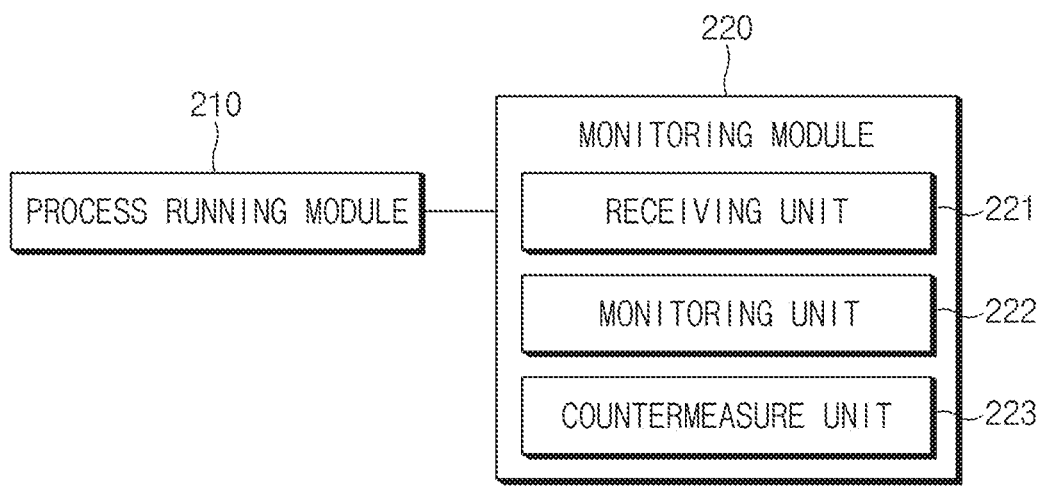
FIG. 2 is a block diagram of a program module to inspect the privilege escalation of the process, according to an embodiment of the disclosure.

FIG. 2 a block diagram of a program module to inspect the privilege escalation of a process, according to an embodiment of the disclosure.

According to an embodiment of the disclosure, the memory 130 of the electronic device 101 may store instructions, and the processor 120 may operate a process running module 210 and a monitoring module 220 of FIG. 2, based on the instructions.

The processor 120 may install an application for running a process before operating the process running module 210 and the monitoring module 220. In addition, the processor 120 may allocate credential information to an application when installing the application. The credential information may include identification information (id) and capability information, and the processor 120 may allocate the identification information, which is included in a preset range, to the application.

The identification information and the capability information may indicate privilege allowing a process of the application to access a system resource. In the Android environment, the identification information may include a user id (uid), an effective user id (euid), a saved user id (suid), a file system user id (fsuid), a group id (gid), an effective group id (egid), a saved group id (sgid), and a file system group id (fsgid).

In the disclosure, when the identification information is included in the preset range, the process has limited privilege, instead of root privilege. When the identification information is not included in the preset range, the privilege allowing the process to access the system resource may be more escalated as compared to when the identification information is included in the preset range.

For example, the preset range of the uid, the euid, the suid, and the fsuid, which are included in the identification information in the Android environment, may be '10,000' or more and less than '20,000'. When at least one of uid, euid, suid, and fsuid is '0', the identification information is not included in the present range, and the process may have root privilege.

In one embodiment, the preset range of the uid, euid, suid, and fsuid may be '1000' or greater and '9999' or less. When at least one of the uid, euid, suid, and fsuid is less than '1000', the processor may have escalated privilege.

In one embodiment, the preset range may include a first range of '1000' to '9999' and a second range of '10000' to less than '20000'. In this case, the processor 120 detects whether the uid of the process having a uid corresponding to the first range is less than '1000', and detects whether the uid of the process having the uid corresponding to the second range is less than '10000'. However, the preset range and the value allowing the process to have the root privilege are not limited thereto The process running module 210 executed by the processor 120 may run a process of the installed application. When running the process, the process running module 210 may store identification information and capability information, which are allocated to the application, at a specific address in the memory 130. In the Android environment, the process running module 210 of the disclosure may be "Zygote".

The monitoring module 220 for the process, which is executed by the processor 120, may include a receiving unit 221, a monitoring unit 222, a countermeasure unit 223, and the like.

The receiving unit 221 may receive an address, at which the identification information and the capability information are stored, from the process running module 210 when the process having the identification information included in the preset range is run, and may register the received address in the monitoring list. For example, when the preset range of the identification information is the range of '10000' or more and less than '20000', and when the identification information of the process is '11000', the receiving unit 221 receives the address, at which '11000', which is the identification information of the process, is stored, from the process running module 210 and may register the address in the monitoring list.

The monitoring unit 222 may monitor the address, at which the identification information is stored, registered in the monitoring list of the receiving unit 221. The monitoring unit 222 may detect whether the identification information stored at the monitored address is included in the preset range.

The monitoring unit 222 may detect the privilege escalation of the process, based on whether the identification information is included in the preset range. The monitoring unit 222 may detect the privilege of the process as being escalated even when the identification information is less than a lower limit value of the preset range, as well as when the identification information is not included in the preset range. For example, on the assumption that the preset range of the identification information is the range of 10000 or more and less than 20000, the monitoring unit 222 may detect the privilege of the process as being escalated when the identification information is less than 10,000, and may not detect the privilege of the process as being escalated when the identification information is 20000 or more.

The monitoring unit 222 may monitor the address, at which the capability information registered in the monitoring list of the receiving unit 221 is stored, and may detect whether the capability information stored at the address is changed.

When a new process is forked, the monitoring unit 222 may detect whether the identification information of the forked process is included in the preset range and may detect whether an address, at which the identification information of the process forking the new process is stored, is stored by the receiving unit 221.

The countermeasure unit 223 may terminate the process having the identification information which does not belong to the preset range. The countermeasure unit 223 may terminate the process, the capability information of which is changed. When the new process is forked, and when the identification information of the forked process is not included in a preset range, and the address, at which the identification information of the process forking the new process is stored, is not registered in the monitoring list of the receiving unit 221, the countermeasure unit 223 may terminate the forking of the new process.

The countermeasure unit 223 may take various actions in addition to the termination of the process, and the details thereof will be described in detail below.

Figure 3:
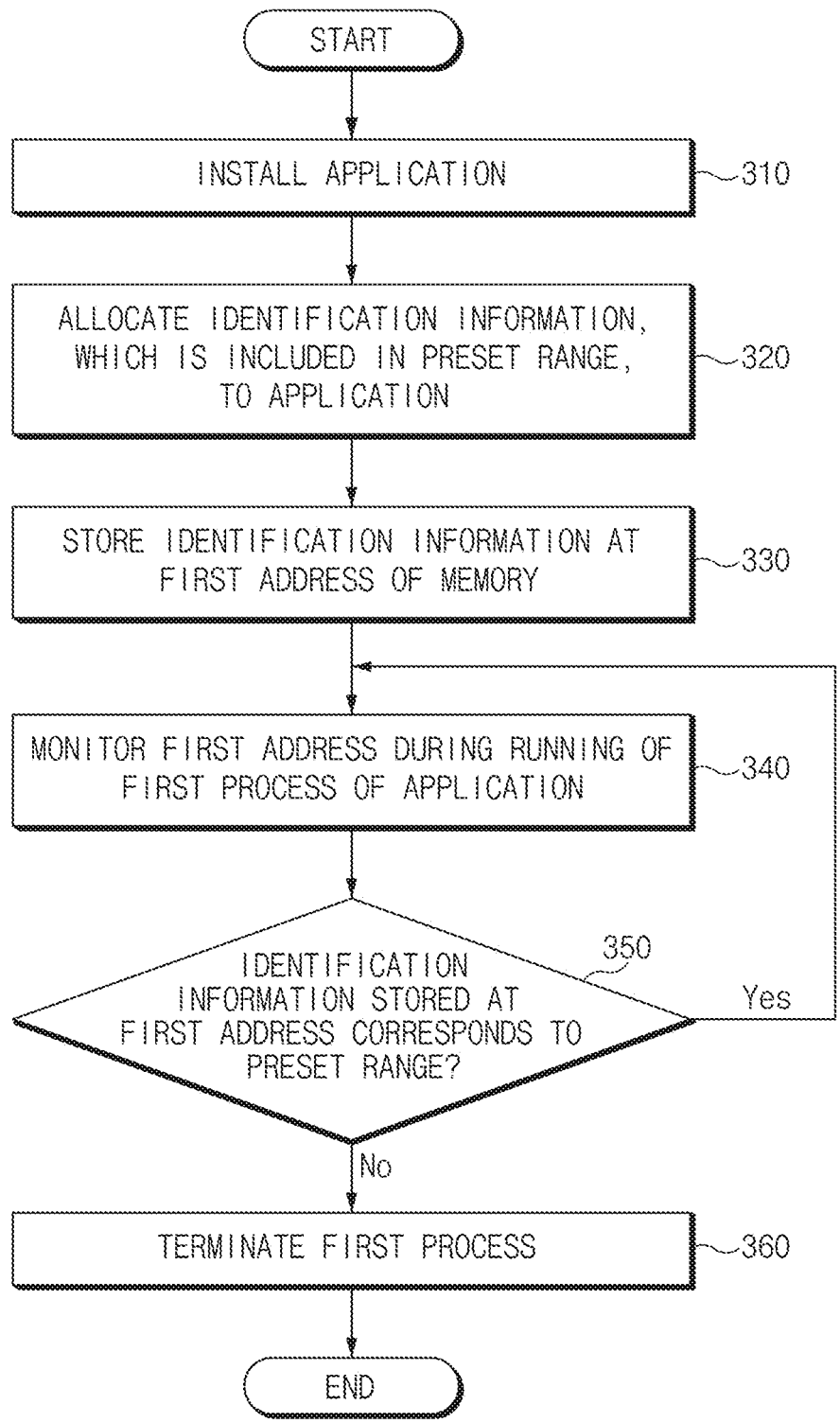
FIG. 3 is a flowchart illustrating a method for inspecting the privilege escalation of the process, according to an embodiment of the disclosure.

FIG. 3 is a flowchart illustrating a method for inspecting privilege escalation of the process, according to an embodiment of the disclosure.

Referring to FIG. 3, the method for inspecting the privilege escalation of the process may include operation 310 of installing an application, operation 320 of allocating identification information included in the preset range to the application, operation 330 of storing identification information, which indicates the privilege allowing the access to a system resource, at a first address of the memory 130, operation 340 of monitoring the first address while the first process of the application is executed, and operations 350 and 360 of terminating the first process when the identification information stored at the first address is not included in the preset range.

In operation 310, the processor 120 may install an application in the electronic device 101.

In operation 320, the processor 120 may allocate identification information and capability information, which are included in a preset range, to the installed application.

In operation 330, the processor 120 may store identification information, which indicates the privilege allowing the access to the system resource, at the first address of the memory 130. The processor 120 may store capability information, which indicates the privilege allowing the access to the system resource, at a second address of the memory 130. Operation 330 may correspond to storing the identification information and the capability information, which are allocated to the application, at a specific address in the memory 130, when the process running module 210 described above runs the process.

In operation 340, the processor 120 may monitor the first address during the running of a first process of the application. The operation 340 may correspond to detecting whether the identification information stored at the first address is included in a preset range, by the monitoring unit 222 of the monitoring module 220 described above.

Hereinafter, the monitoring operation by the processor 120 will be described in more detail with reference to FIGS. 4 to 6.

Figure 4:
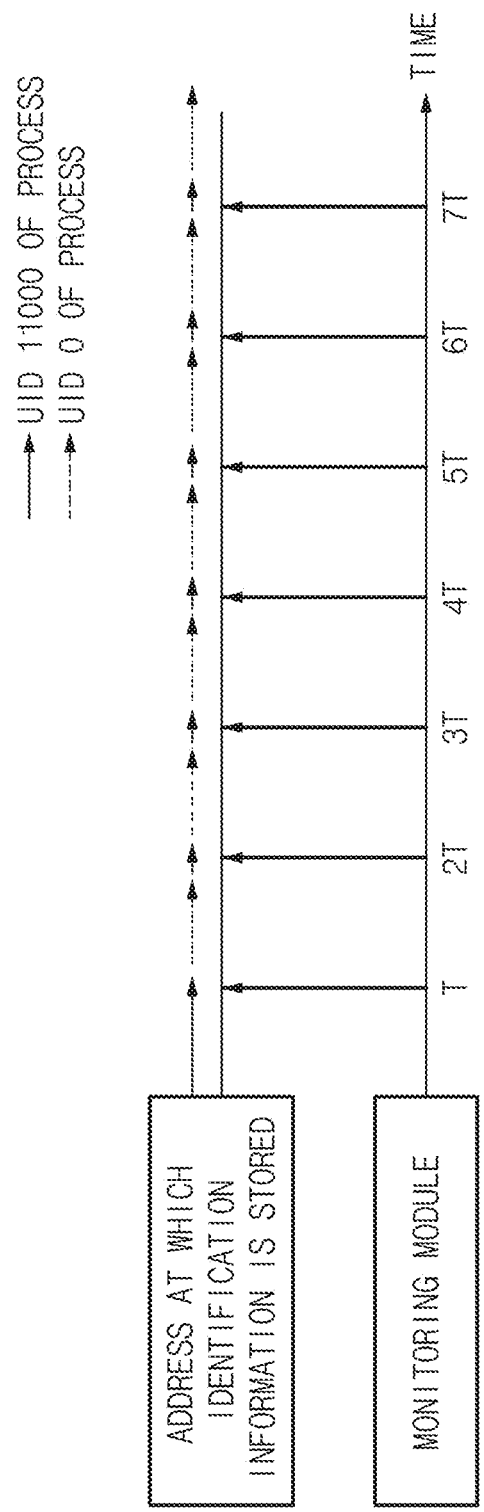
FIG. 4 is a view illustrating that the address, at which the identification information is stored, is periodically monitored, according to an embodiment of the disclosure.
Figure 5:
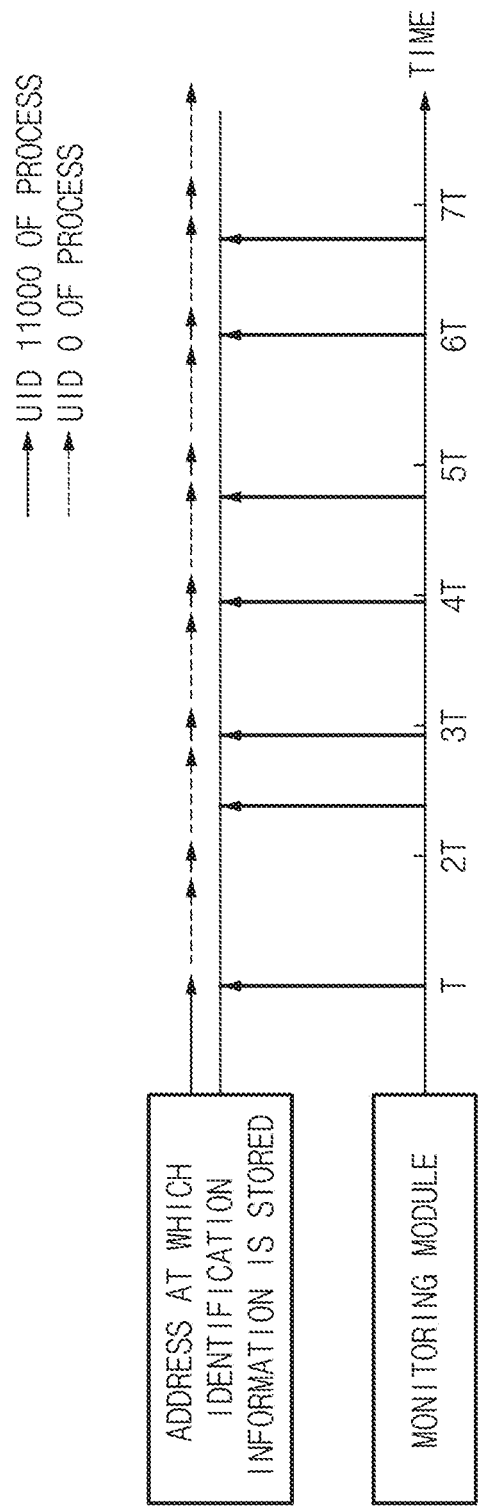
FIG. 5 is a view illustrating that the address, at which the identification information is stored, is aperiodically monitored, according to an embodiment of the disclosure.
Figure 6:
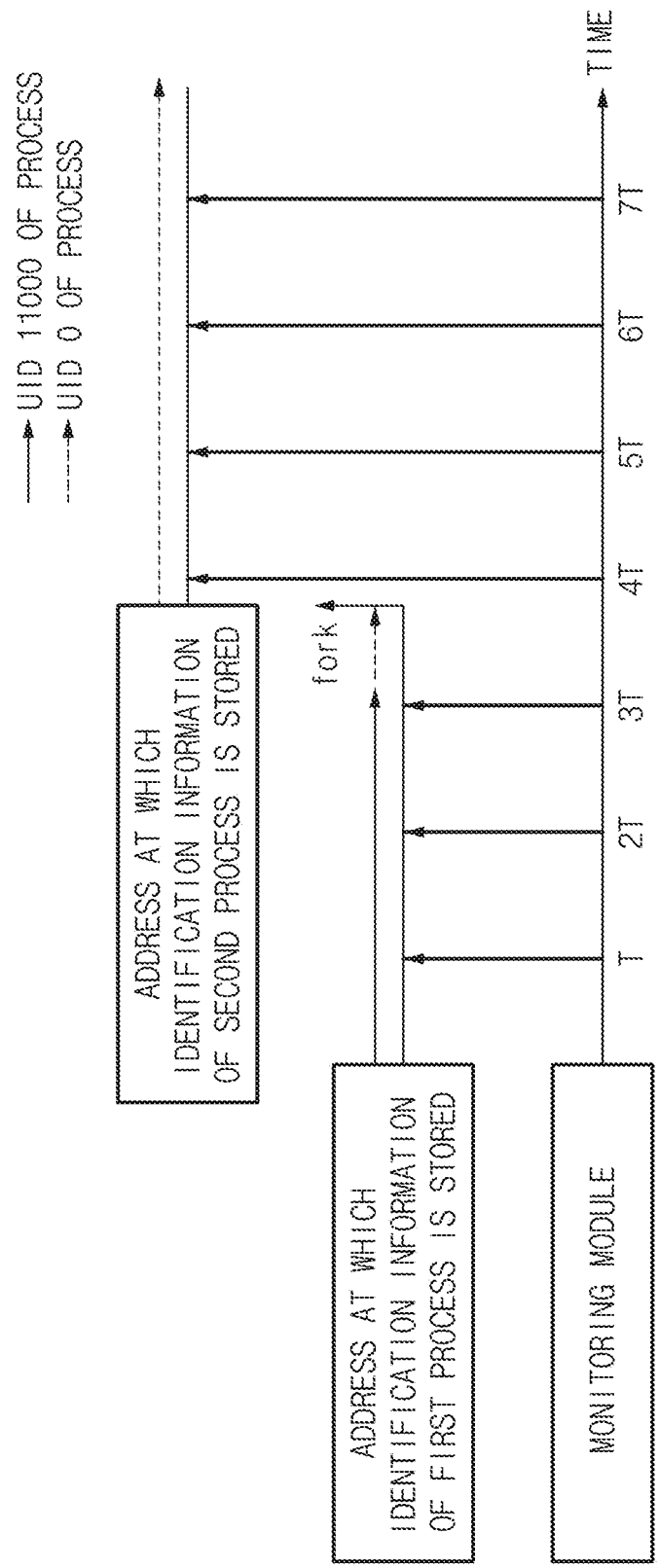
FIG. 6 is a view illustrating monitoring of an address, at which identification information of the first process is stored, and an address, at which the identification information of the second process forked by the first process is stored, according to an embodiment of the disclosure.

In FIGS. 4 to 6, it is assumed that the identification information of the process is UID, and the preset range of the UID is the range of 10000 or more and less than 20000.

FIG. 4 is a diagram illustrating that an address, at which the identification information is stored, is periodically monitored, according to an embodiment of the disclosure. FIG. 5 is a diagram illustrating that an address, at which the identification information is stored, is aperiodically monitored, according to an embodiment of the disclosure.

As illustrated in FIG. 4, the processor 120 may monitor an address in the period of 'T' and may detect whether the identification information stored at the address is included in the preset range. However, as illustrated in FIG. 4, the processor 120 may not detect that the privilege of the process is escalated, when the identification information is included in the present range (UID is 11000) at the monitoring time point by the processor 120 and when the identification information of the process is changed not to be included in the preset range (UID is '0') at the time point that the processor 120 does not monitor.

When aperiodically monitoring the address as illustrated in FIG. 5, the processor 120 may detect that the identification information stored at the address is changed not to be included in the preset range (UID is '0'), even if the identification information of the process is periodically changed.

When the processor 120 aperiodically monitors the address as illustrated in FIG. 5, the timing for monitoring the address may be set such that the address is monitored at a time point obtained by adding or subtracting a second of 't', which is less than the period of 'T', to or from the period of 'T'. For example, on the assumption that the period of 'T' is set to '1' second, 't' is set to an arbitrary value less than '1' second, the processor 120 may monitor the address at 1+0 second (1 second), 2+0.5 second (2.5 second), 3−0.1 second (2.9 seconds), 4−0.05 second (3.95 seconds), 5−0.2 second (4.8 seconds), 6+0 second (6 seconds), and 7−0.3 second (6.7 second).

FIG. 6 is a view illustrating monitoring of an address, at which identification information of the first process is stored, and an address, at which the identification information of the second process forked by the first process is stored, according to an embodiment of the disclosure.

As illustrated in FIG. 6, after the identification information of the first process, the address of the identification information of which is monitored, is changed not to be included in the preset range (UID is '0'), the first process may fork the second process and may be terminated for itself. The identification information of the second process, which is forked, is the same as the identification information of the first process, and the identification information of the first process at the time point at which the second process is forked is not included in the preset range (UID is '0'). Accordingly, the address, at which the identification information of the second process is stored, is not registered in the monitoring list by the receiving unit 221 of the monitoring module 220. The forked second process may be run in the state that the privilege over the system resource is escalated, and the address, at which the identification information of the second process is stored, is not monitored by the processor 120.

To detect the escalation of the access privilege of the process, when the new process is forked, the processor 120 may detect whether the identification information is included in the preset range, by monitoring the address at which the identification information of the forked process is stored. When the identification information of the forked process is not included in the preset range, the processor 120 may detect whether the address, at which the identification information of the process forking a new process is stored, is monitored. In other words, the processor 120 may detect whether the address, at which the identification information of the process forking the new process is stored, has been registered in the monitoring list of the receiving unit 221 of the monitoring module 220.

The processor 120 may detect the privilege of the process as being escalated, when the identification information of the forked process is not included in a preset range, and when the address at which the identification information of the process forking the new process is stored is not monitored.

According to another embodiment of the disclosure, in operation 340, the processor 120 may monitor the second address during the running of the first process of the application. The operation 340 may correspond to that the above-described monitoring unit 222 of the monitoring module 220 detects whether the identification information stored at the first address is included in a preset range. The processor 120 may detect the privilege of the process as being escalated when the capability information stored in the second address is changed.

According to an embodiment, whenever a system call occurs, the processor may monitor the address, at which the identification information of the process is stored, and detect whether the identification information stored at the address is included in the preset range.

For example, when a system call for registering the address of uid in the monitoring list of the receiving unit or a system call for deleting the address of the uid occurs, the processor may monitor the address, at which the identification information is stored, and detect whether the identification information is included in the preset range.

When the identification information, which is stored at the first address, does not correspond to the preset range, or when the capability information stored at the second address is changed in operation 350, the processor 120 may terminate the first process in operation 360.

The processor 120 may terminate the first process and may indicate that the access privilege of the process having the identification information, which is not included in the preset range, is escalated, by setting a flag value, such as a warranty bit, which is not modified.

In addition, the processor 120 may store information of the first process, which is terminated, and may encrypt and store information of the first process. The information of the first process, which is stored, may include a name of the first process, a processor id (Pid), a parent processor id (PPid), a parent process name, or a time at which the identification information of the first process is not included in the preset range is detected.

In addition, the processor 120 may notify a security module of the electronic device 101 or the service module such as the firmware over the air (FOTA) of that the privilege of the first process has been escalated as the identification information of the first process is not included in a preset range.

In addition, the processor 120 may transmit a file associated with the first process, which is terminated, to an external server.

Hereinafter, the procedure of processing a process by the module of inspecting the privilege escalation of the process under the android environment will be described with reference to FIG. 7 according to an embodiment of the disclosure.

Figure 7:
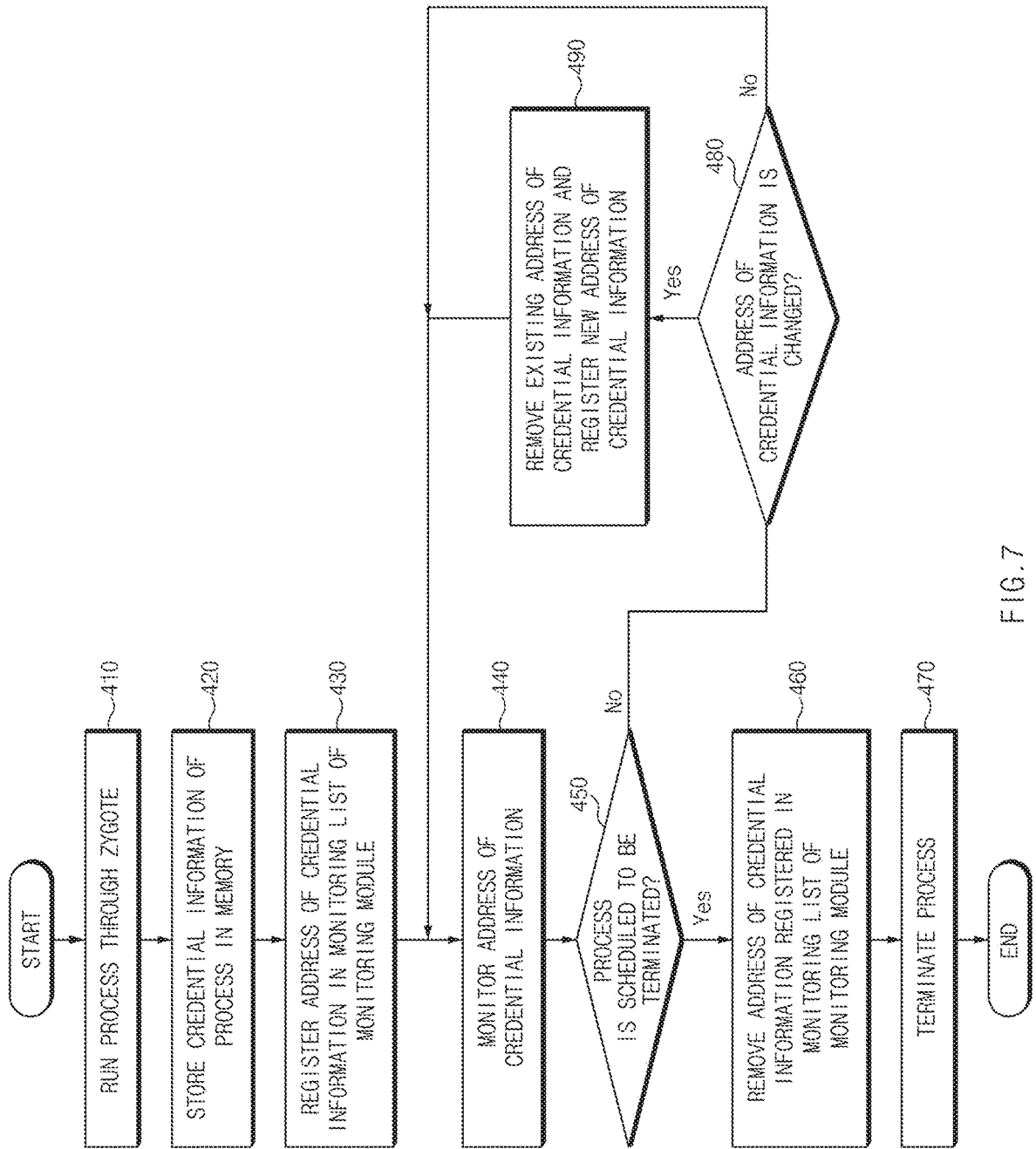
FIG. 7 is a flowchart illustrating that the process is processed by the module to inspect the privilege escalation of the process under the Android environment, according to an embodiment of the disclosure.

FIG. 7 is a flowchart illustrating that the process is processed by the module to inspect the privilege escalation of the process under the Android environment, according to an embodiment of the disclosure.

The Zigot is a software module that runs a process on Android, and the process may be run through the Zigot in operation 410.

In operation 420, the credential information of the process may be stored in the memory 130. The credential information of the process may include identification information and capability information indicating the access privilege of the process to the system resource.

In operation 430, the address at which credential information is stored in the memory 130 may be registered in the monitoring module 220. When the credential information of the process is stored in the memory 130, the receiving unit 221 of the monitoring module 220 may receive the address at which the credential information is stored and may register the received address in the monitoring list.

In operation 440, the address at which the credential information of the process is stored may be monitored. The address, at which the credential information is stored, is monitored by the monitoring unit 222 of the monitoring module 220, thereby detecting whether the identification information of the process is included in the preset range or whether the credential information of the process is changed.

When the process is scheduled to be terminated in operation 450, operation 460 may be performed. In other words, when the identification information is not included in the preset range or when the credential information, which has been changed, is detected in operation 440, operation 460 may be performed.

The address, which is registered in the monitoring list of the monitoring module 220, of the credential information of the process may be removed in operation 460, and the process may be terminated in operation 470.

When the process is not scheduled to be terminated in operation 450, operation 480 may be performed. When it is detected that the address, at which the credential information of the process is stored, is changed in operation 480, the address of existing credential information is removed from the monitoring list of the monitoring module 220, and the address of new credential information may be registered in the monitoring list of the monitoring module 220. When the address, at which the credential information of the process, is not changed in operation 480, operation 440 may be performed.

Figure 8:
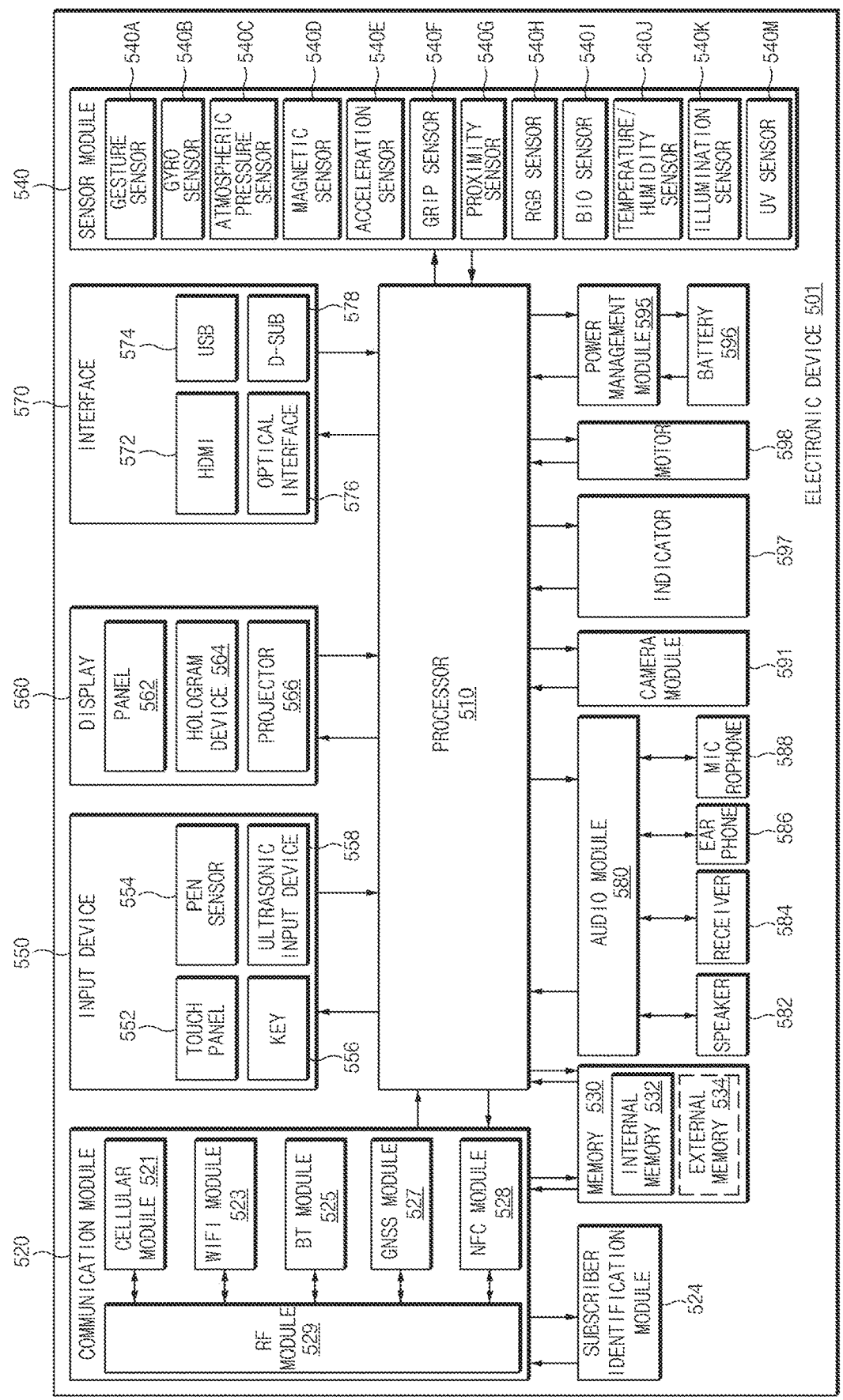
FIG. 8 is a block diagram illustrating an electronic device, according to various embodiments.

FIG. 8 illustrates a block diagram of an electronic device, according to various embodiments.

Referring to FIG. 8, an electronic device 501 may include, for example, all or a part of the electronic device 101 illustrated in FIG. 1. The electronic device 501 may include one or more processors (e.g., an application processor (AP)) 510, a communication module 520, a subscriber identification module 524, a memory 530, a sensor module 540, an input device 550, a display 560, an interface 570, an audio module 580, a camera module 591, a power management module 595, a battery 596, an indicator 597, and a motor 598.

The processor 510 may drive, for example, an operating system (OS) or an application to control a plurality of hardware or software components connected to the processor 510 and may process and compute a variety of data. For example, the processor 510 may be implemented with a System on Chip (SoC). According to an embodiment, the processor 510 may further include a graphic processing unit (GPU) and/or an image signal processor. The processor 510 may include at least a part (e.g., a cellular module 521) of components illustrated in FIG. 8. The processor 510 may load a command or data, which is received from at least one of other components (e.g., a nonvolatile memory), into a volatile memory and process the loaded command or data. The processor 510 may store a variety of data in the nonvolatile memory.

The communication module 520 may be configured the same as or similar to the communication interface 170 of FIG. 1. The communication module 520 may include a cellular module 521, a Wi-Fi module 523, a Bluetooth (BT) module 525, a GNSS module 527 (e.g., a GPS module, a Glonass module, a Beidou module, or a Galileo module), a near field communication (NFC) module 528, a MST module and a radio frequency (RF) module 529.

The cellular module 521 may provide, for example, voice communication, video communication, a character service, an Internet service, or the like over a communication network. According to an embodiment, the cellular module 521 may perform discrimination and authentication of the electronic device 501 within a communication network by using the subscriber identification module (e.g., a SIM card) 524. According to an embodiment, the cellular module 521 may perform at least a portion of functions that the processor 510 provides. According to an embodiment, the cellular module 521 may include a communication processor (CP).

Each of the Wi-Fi module 523, the BT module 525, the GNSS module 527, the NFC module 528, or the MST module may include a processor for processing data exchanged through a corresponding module, for example. According to an embodiment, at least a part (e.g., two or more) of the cellular module 521, the Wi-Fi module 523, the BT module 525, the GNSS module 527, the NFC module 528, or the MST module may be included within one Integrated Circuit (IC) or an IC package.

For example, the RF module 529 may transmit and receive a communication signal (e.g., an RF signal). For example, the RF module 529 may include a transceiver, a power amplifier module (PAM), a frequency filter, a low noise amplifier (LNA), an antenna, or the like. According to another embodiment, at least one of the cellular module 521, the Wi-Fi module 523, the BT module 525, the GNSS module 527, the NFC module 528, or the MST module may transmit and receive an RF signal through a separate RF module.

The subscriber identification module 524 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 530 (e.g., the memory 130) may include an internal memory 532 or an external memory 534. For example, the internal memory 532 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 534 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 534 may be operatively and/or physically connected to the electronic device 501 through various interfaces.

A security module may be a module that includes a storage space of which a security level is higher than that of the memory 530 and may be a circuit that guarantees safe data storage and a protected execution environment. The security module may be implemented with a separate circuit and may include a separate processor. For example, the security module may be in a smart chip or a secure digital (SD) card, which is removable, or may include an embedded secure element (eSE) embedded in a fixed chip of the electronic device 501. Furthermore, the security module may operate based on an operating system (OS) that is different from the OS of the electronic device 501. For example, the security module may operate based on java card open platform (JCOP) OS.

The sensor module 540 may measure, for example, a physical quantity or may detect an operation state of the electronic device 501. The sensor module 540 may convert the measured or detected information to an electric signal. For example, the sensor module 540 may include at least one of a gesture sensor 540A, a gyro sensor 540B, a barometric pressure sensor 540C, a magnetic sensor 540D, an acceleration sensor 540E, a grip sensor 540F, the proximity sensor 540G, a color sensor 540H (e.g., red, green, blue (RGB) sensor), a biometric sensor 540I, a temperature/humidity sensor 540J, an illuminance sensor 540K, or an UV sensor 540M. Although not illustrated, additionally or alternatively, the sensor module 540 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 540 may further include a control circuit for controlling at least one or more sensors included therein. According to an embodiment, the electronic device 501 may further include a processor that is a part of the processor 510 or independent of the processor 510 and is configured to control the sensor module 540. The processor may control the sensor module 540 while the processor 510 remains at a sleep state.

The input device 550 may include, for example, a touch panel 552, a (digital) pen sensor 554, a key 556, or an ultrasonic input device 558. For example, the touch panel 552 may use at least one of capacitive, resistive, infrared and ultrasonic detecting methods. Also, the touch panel 552 may further include a control circuit. The touch panel 552 may further include a tactile layer to provide a tactile reaction to a user.

The (digital) pen sensor 554 may be, for example, a part of a touch panel or may include an additional sheet for recognition. The key 556 may include, for example, a physical button, an optical key, a keypad, or the like. The ultrasonic input device 558 may detect (or sense) an ultrasonic signal, which is generated from an input device, through a microphone (e.g., a microphone 588) and may identify data corresponding to the detected ultrasonic signal.

The display 560 (e.g., the display 160) may include a panel 562, a hologram device 564, or a projector 566. The panel 562 may be the same as or similar to the display 160 illustrated in FIG. 1. The panel 562 may be implemented, for example, to be flexible, transparent or wearable. The panel 562 and the touch panel 552 may be integrated into a single module. The hologram device 564 may display a stereoscopic image in a space using a light interference phenomenon. The projector 566 may project light onto a screen so as to display an image. For example, the screen may be arranged in the inside or the outside of the electronic device 501. According to an embodiment, the display 560 may further include a control circuit for controlling the panel 562, the hologram device 564, or the projector 566.

The interface 570 may include, for example, a high-definition multimedia interface (HDMI) 572, a universal serial bus (USB) 574, an optical interface 576, or a D-sub-miniature (D-sub) 578. The interface 570 may be included, for example, in the communication interface 170 illustrated in FIG. 1. Additionally or alternatively, the interface 570 may include, for example, a mobile high definition link (MHL) interface, a SD card/multi-media card (MMC) interface, or an infrared data association (IrDA) standard interface.

The audio module 580 may convert a sound and an electric signal in dual directions. At least a component of the audio module 580 may be included, for example, in the input/output interface 150 illustrated in FIG. 1. The audio module 580 may process, for example, sound information that is input or output through a speaker 582, a receiver 584, an earphone 586, or the microphone 588.

For example, the camera module 591 may shoot a still image or a video. According to an embodiment, the camera module 591 may include at least one or more image sensors (e.g., a front sensor or a rear sensor), a lens, an image signal processor (ISP), or a flash (e.g., an LED or a xenon lamp).

The power management module 595 may manage, for example, power of the electronic device 501. According to an embodiment, a power management integrated circuit (PMIC), a charger IC, or a battery or fuel gauge may be included in the power management module 595. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 596 and a voltage, current or temperature thereof while the battery is charged. The battery 596 may include, for example, a rechargeable battery and/or a solar battery.

The indicator 597 may display a specific state of the electronic device 501 or a part thereof (e.g., the processor 510), such as a booting state, a message state, a charging state, and the like. The motor 598 may convert an electrical signal into a mechanical vibration and may generate the following effects: vibration, haptic, and the like. Although not illustrated, a processing device (e.g., a GPU) for supporting a mobile TV may be included in the electronic device 501. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 9:
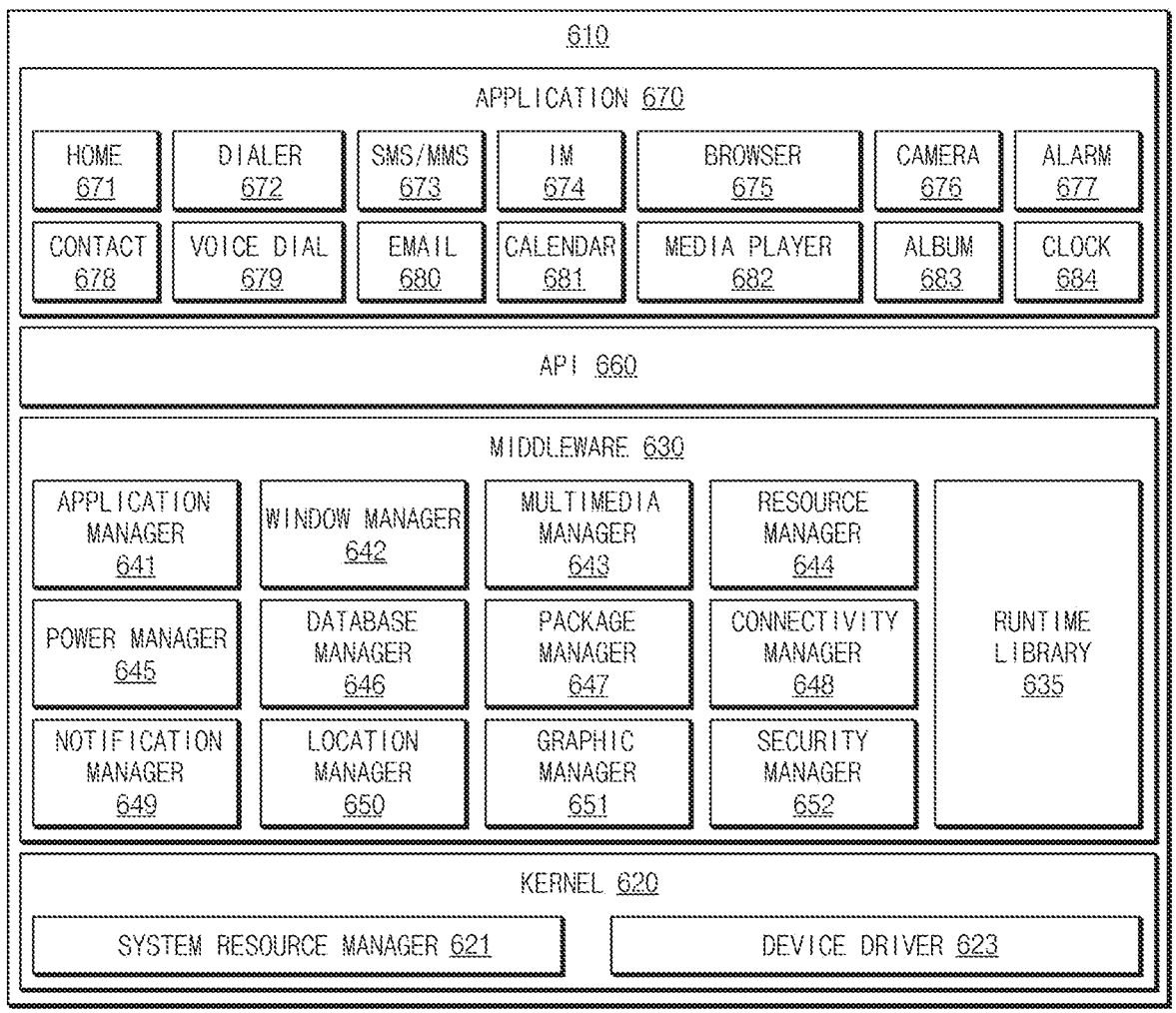
FIG. 9 is a block diagram of a program module according to various embodiments.

FIG. 9 illustrates a block diagram of a program module, according to various embodiments.

According to an embodiment, a program module 610 (e.g., the program 140) may include an operating system (OS) to control resources associated with an electronic device (e.g., the electronic device 101), and/or diverse applications (e.g., the application program 147) driven on the OS. The OS may be, for example, Android™ iOS™, Windows™, Symbian™, or Tizen™.

The program module 610 may include a kernel 620, a middleware 630, an application programming interface (API) 660, and/or an application 670. At least a portion of the program module 610 may be preloaded on an electronic device or may be downloadable from an external electronic device (e.g., the first electronic device 102, the second electronic device 104, the server 106, or the like).

The kernel 620 (e.g., the kernel 141) may include, for example, a system resource manager 621 or a device driver 623. The system resource manager 621 may perform control, allocation, or retrieval of system resources. According to an embodiment, the system resource manager 621 may include a process managing unit, a memory managing unit, or a file system managing unit. The device driver 623 may include, for example, a display driver, a camera driver, a Bluetooth driver, a shared memory driver, a USB driver, a keypad driver, a Wi-Fi driver, an audio driver, or an inter-process communication (IPC) driver.

The middleware 630 may provide, for example, a function that the application 670 needs in common, or may provide diverse functions to the application 670 through the API 660 to allow the application 670 to efficiently use limited system resources of the electronic device. According to an embodiment, the middleware 630 (e.g., the middleware 143) may include at least one of a runtime library 635, an application manager 641, a window manager 642, a multimedia manager 643, a resource manager 644, a power manager 645, a database manager 646, a package manager 647, a connectivity manager 648, a notification manager 649, a location manager 650, a graphic manager 651, a security manager 652, or a payment manager 654.

The runtime library 635 may include, for example, a library module that is used by a compiler to add a new function through a programming language while the application 670 is being executed. The runtime library 635 may perform input/output management, memory management, or capacities about arithmetic functions.

The application manager 641 may manage, for example, a life cycle of at least one application of the application 670. The window manager 642 may manage a graphic user interface (GUI) resource that is used in a screen. The multimedia manager 643 may identify a format necessary for playing diverse media files, and may perform encoding or decoding of media files by using a codec suitable for the format. The resource manager 644 may manage resources such as a storage space, memory, or source code of at least one application of the application 670.

The power manager 645 may operate, for example, with a basic input/output system (BIOS) to manage a battery or power, and may provide power information for an operation of an electronic device. The database manager 646 may generate, search for, or modify database that is to be used in at least one application of the application 670. The package manager 647 may install or update an application that is distributed in the form of package file.

The connectivity manager 648 may manage, for example, wireless connection such as Wi-Fi or Bluetooth. The notification manager 649 may display or notify an event such as arrival message, appointment, or proximity notification in a mode that does not disturb a user. The location manager 650 may manage location information about an electronic device. The graphic manager 651 may manage a graphic effect that is provided to a user, or manage a user interface relevant thereto. The security manager 652 may provide a general security function necessary for system security, user authentication, or the like. According to an embodiment, in the case where an electronic device (e.g., the electronic device 101) includes a telephony function, the middleware 630 may further include a telephony manager for managing a voice or video call function of the electronic device.

The middleware 630 may include a middleware module that combines diverse functions of the above-described components. The middleware 630 may provide a module specialized to each OS kind to provide differentiated functions. Additionally, the middleware 630 may dynamically remove a part of the preexisting components or may add new components thereto.

The API 660 (e.g., the API 145) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 670 (e.g., the application program 147) may include, for example, one or more applications capable of providing functions for a home 671, a dialer 672, an SMS/MMS 673, an instant message (IM) 674, a browser 675, a camera 676, an alarm 677, a contact 678, a voice dial 679, an e-mail 680, a calendar 681, a media player 682, an album 683, or a timepiece 684 or for offering health care (e.g., measuring an exercise quantity, blood sugar, or the like) or environment information (e.g., information of barometric pressure, humidity, temperature, or the like).

According to an embodiment, the application 670 may include an application (hereinafter referred to as "information exchanging application" for descriptive convenience) to support information exchange between an electronic device (e.g., the electronic device 101) and an external electronic device (e.g., the first electronic device 102 or the second electronic device 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 670 may include an application (e.g., a health care application of a mobile medical device) that is allocated in accordance with an attribute of an external electronic device. According to an embodiment, the application 670 may include an application that is received from an external electronic device (e.g., the first electronic device 102, the second electronic device 104, or the server 106). According to an embodiment, the application 670 may include a preloaded application or a third party application that is downloadable from a server. The names of components of the program module 610 according to the embodiment may be modifiable depending on kinds of operating systems.

According to various embodiments, at least a portion of the program module 610 may be implemented by software, firmware, hardware, or a combination of two or more thereof At least a portion of the program module 610 may be implemented (e.g., executed), for example, by the processor (e.g., the processor 510). At least a portion of the program module 610 may include, for example, modules, programs, routines, sets of instructions, processes, or the like for performing one or more functions.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a memory; and
a processor electrically connected with the memory,
wherein the processor is configured to:
install an application,
allocate identification information, which is included in a preset range, to the installed application, wherein the identification information is for indicating access privilege to a system resource,
store the identification information at a first address of the memory,
monitor the identification information by monitoring the first address at which the identification information is stored, during running of a first process of the application to which the identification information is allocated, terminate the first process of the application, in response to the identification information allocated to the application not being included in the preset range, wherein the first process has not the access privilege to the system resource when the identification information is not included in the preset range, and terminate forking of a second process, in response to the second process being forked, and in response to identification information for indicating access privilege of the second process to the system resource not being included in the preset range, and an address, at which identification information for indicating access privilege of a process, which forks the second process, to the system resource is stored, is not monitored.

2. The electronic device of claim 1, wherein the processor is further configured to:

store, at a second address of the memory, capability information for indicating access privilege of the first process to the system resource;

monitor the second address during running of the first process; and terminate the first process, in response to the capability information stored at the second address being changed.

3. The electronic device of claim 1, wherein the processor is further configured to:

set a flag value for indicating that access privilege of a process having the identification information is escalated, in response to the identification information stored at the first address not corresponding to the preset range.

4. The electronic device of claim 1, wherein the processor is further configured to:

store information of the first process, in response to the identification information stored at the first address not corresponding to the preset range.

5. The electronic device of claim 4, wherein the processor is further configured to:

encrypt and store the information of the first process.

6. The electronic device of claim 4, wherein the information, which is stored by the processor, of the first process includes at least one of a name of the first process or time at which identification information of the first process does not correspond to the preset range.

7. The electronic device of claim 1, wherein the processor is further configured to:

transfer a file associated with the first process to an external server, in response to the identification information stored at the first address not corresponding to the preset range.

8. A storage medium to store computer-readable instructions, the storage medium comprising instructions that, when executed by an electronic device, cause the electronic device to:

install an application;

allocate identification information, which is included in a preset range, to the installed application, wherein the identification information is for indicating access privilege to a system resource;

store the identification information at a first address of a memory;

monitor the identification information by monitoring the first address at which the identification information is stored, during running of a first process of the application to which the identification information is allocated;

terminate the first process of the application, in response to the identification information allocated to the application not corresponding to the preset range, wherein the first process has not the access privilege to the system resource when the identification information is not included in the preset range; and terminate forking of a second process, in response to the second process being forked, and in response to identification information for indicating access privilege of the second process to the system resource not being included in the preset range, and an address, at which identification information for indicating access privilege of a process, which forks the second process, to the system resource is stored, is not monitored.

9. The storage medium of claim 8, further comprising: an instruction to perform:

storing, at a second address of the memory, capability information for indicating access privilege of the first process to the system resource, monitoring the second address during running of the first process, and terminating the first process, in response to the capability information stored at the second address being changed.

10. The storage medium of claim 8, further comprising: an instruction to perform:

setting a flag value for indicating that access privilege of a process having the identification information is escalated, in response to the identification information stored at the first address not corresponding to the preset range.

11. The storage medium of claim 8, further comprising: an instruction to perform storing information of the first process, in response to the identification information stored at the first address not corresponding to the preset range.

12. The storage medium of claim 8, further comprising: an instruction to perform encrypting and storing information of the first process.

13. The storage medium of claim 8, further comprising: an instruction to perform transferring a file associated with the first process to an external server, in response to the identification information stored in the first address not corresponding to the preset range.

14. The storage medium of claim 10, wherein the flag value comprises a warranty bit.

15. The storage medium of claim 8, further comprising: an instruction to perform notifying a security module that the access privilege of the process having the identification information is escalated, in response to the identification information stored at the first address not corresponding to the preset range.

16. The storage medium of claim 15, wherein the security module comprises an embedded secure element (eSE) embedded in a fixed chip of the electronic device.

* * * * *